US007643695B2

(12) United States Patent
Nakayama

(10) Patent No.: US 7,643,695 B2
(45) Date of Patent: Jan. 5, 2010

(54) IMAGE CODING APPARATUS AND ITS CONTROL METHOD, AND COMPUTER PROGRAM AND COMPUTER READABLE STORAGE MEDIUM

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 11/492,812

(22) Filed: Jul. 26, 2006

(65) Prior Publication Data
US 2007/0025632 A1 Feb. 1, 2007

(30) Foreign Application Priority Data
Jul. 29, 2005 (JP) ............................. 2005-221461

(51) Int. Cl.
*G06K 9/00* (2006.01)
(52) U.S. Cl. .................................................... 382/251
(58) Field of Classification Search .................. 382/232, 382/251
See application file for complete search history.

(56) References Cited

U.S. PATENT DOCUMENTS

| 5,333,012 | A  | * | 7/1994  | Singhal et al. ......... 375/240.04 |
| 5,410,352 | A  | * | 4/1995  | Watanabe ............. 375/240.03 |
| 5,581,373 | A  |   | 12/1996 | Yoshida ...................... 358/476 |
| 5,801,650 | A  |   | 9/1998  | Nakayama ..................... 341/67 |
| 5,818,970 | A  |   | 10/1998 | Ishikawa et al. ............. 382/248 |
| 5,841,381 | A  |   | 11/1998 | Nakayama ..................... 341/67 |
| 5,986,594 | A  |   | 11/1999 | Nakayama et al. .......... 341/107 |
| 6,408,102 | B1 |   | 6/2002  | Nakayama .................. 382/246 |
| 6,501,858 | B1 | * | 12/2002 | Terane ........................ 382/239 |
| 6,549,676 | B1 |   | 4/2003  | Nakayama et al. .......... 382/246 |
| 6,553,143 | B2 |   | 4/2003  | Miyake et al. .............. 382/239 |
| 6,560,365 | B1 |   | 5/2003  | Nakayama et al. .......... 382/233 |
| 6,567,562 | B1 |   | 5/2003  | Nakayama et al. .......... 382/246 |
| 6,711,295 | B2 |   | 3/2004  | Nakayama et al. .......... 382/232 |
| 6,807,308 | B2 | * | 10/2004 | Chui et al. ................... 382/240 |
| 6,865,299 | B1 |   | 3/2005  | Nakayama .................. 382/246 |
| 6,898,310 | B1 |   | 5/2005  | Ohmi et al. ................. 382/166 |

(Continued)

OTHER PUBLICATIONS

Section B.2.2. "Frame Header Syntax" of Annex B of ITU-T Recommendation T.81 (ISO/IEC 10918-1), Information Technology—Digital Compression and Coding of Continuous-Tone Still Images—Requirements and Guidelines, 2 pages, Sep. 1992.

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

This invention allows Huffman encoding using a common Huffman table according to basic quantization values $Q_{i,j}$ even when image data expressed by n bits falling within the range from L to K is JPEG-coded, and can suppress the Huffman table size from increasing. To this end, a basic quantization table storage unit stores quantization step values $Q_{0,0}$ to $Q_{7,7}$ used in baseline JPEG coding. A minimum quantization step generator outputs a minimum quantization step value $Q_{n\_min}$ to a comparator/selector according to the number n of bits of each color component of image data to be coded. The comparator/selector compares the quantization step values $Q_{0,0}$ to $Q_{7,7}$ with $Q_{n\_min}$ and selects larger ones, and outputs the comparison results to a quantizer as $Q'_{i,j}$. The quantizer stores $Q'_{i,j}$ in a quantization table storage unit and quantizes orthogonal transformation coefficients output from a DCT transformer.

9 Claims, 6 Drawing Sheets

U.S. PATENT DOCUMENTS

| | | | |
|---|---|---|---|
| 6,952,501 B2 | 10/2005 | Nakayama | 382/243 |
| 6,996,593 B2 | 2/2006 | Nakayama | 708/316 |
| 7,106,911 B2 | 9/2006 | Ohta et al. | 382/251 |
| 7,127,115 B2 | 10/2006 | Osawa et al. | 382/239 |
| 7,194,140 B2 | 3/2007 | Ito et al. | 382/251 |
| 7,227,998 B2 | 6/2007 | Nakayama et al. | 382/232 |
| 7,236,997 B2 | 6/2007 | Nakayama | 708/300 |
| 2003/0043905 A1 | 3/2003 | Nakayama et al. | 375/240.04 |
| 2004/0258320 A1 | 12/2004 | Nakayama | 382/250 |
| 2005/0276500 A1 | 12/2005 | Nakayama et al. | 382/251 |
| 2005/0276501 A1 | 12/2005 | Nakayama et al. | 382/251 |
| 2006/0039626 A1 | 2/2006 | Nakayama | 382/276 |
| 2007/0206868 A1 | 9/2007 | Nakayama | 382/232 |

\* cited by examiner

FIG. 4

| $Q_{0,0}$ | $Q_{1,0}$ | ... | | | | | $Q_{7,0}$ |
|---|---|---|---|---|---|---|---|
| $Q_{0,1}$ | ⋱ | | | | | | |
| ⋮ | | | | | | | |
| | | | | | | | |
| | | | | | | | |
| | | | | | | | |
| | | | | | | | |
| $Q_{0,7}$ | | | | | | | $Q_{7,7}$ |

QUANTIZATION STEP OF BASELINE JPEG

FIG. 5

| NUMBER OF BITS | MINIMUM QUANTIZATION STEP VALUE |
|---|---|
| 8 | $Q_{8\_mim}$ |
| 9 | $Q_{9\_mim}$ |
| 10 | $Q_{10\_mim}$ |
| 11 | $Q_{11\_mim}$ |
| 12 | $Q_{12\_mim}$ |

IMAGE CODING APPARATUS AND ITS CONTROL METHOD, AND COMPUTER PROGRAM AND COMPUTER READABLE STORAGE MEDIUM

BACKGROUND OF THE INVENTION

1. Field of the Invention

The present invention relates to a compression coding technique of image data.

2. Description of the Related Art

JPEG as an international standard encoding scheme of still image data includes lossy coding that exploits the discrete cosine transform (DCT) and lossless coding using predictive coding. Also, JPEG specifies coding/decoding processing of color image data of 8 bits per color component and color image data of 12 bits per color component. Coding of an 8-bit image using the DCT is dubbed baseline JPEG, and coding of a 12-bit image including 8 bits is dubbed extended JPEG and distinguished from the former. The present invention relates to lossy coding using the DCT.

Details are described in Section B.2.2. "Frame header syntax" of Annex B of "ITU-T recommendation T.81 (ISO/IEC 10918-1)". Table B.2 in Section B.2.2. of this reference specifies the sizes and values of frame header parameters, and also the numbers of bits of image data to be coded/decoded as the second parameter P. Baseline JPEG sequential DCT is limited to only an 8-bit image, and extended sequential DCT and progressive DCT can code/decode 8-bit and 12-bit images. The number of coded bits in image data is described in the frame header parameter. Since decoding processing is done based on that parameter, the number of bits of coded image data is equal to the number of bits of image data after decoding for both the numbers of bits.

A color image input device used so far generates data with a precision of 8 bits or less per color component in terms of technical problems and cost. Therefore, JPEG compression or simply JPEG generally means baseline JPEG that compresses 8-bit data.

In recent years, along with the improvement of the precision of an image input device, a digital camera, scanner, and the like can easily generate image data with a precision over 8 bits. Hence, the necessity of extended JPEG that can compress 12-bit data is increasing.

A major difference between extended JPEG and baseline JPEG is that in the former the number of bits of input data is 12 bits (increased by 4 bits), and is extended so that a color converter, DCT transformer, and quantizer can process 16-fold values (precision).

The extended JPEG coding processing flow of a 12-bit image per color component will be described below using the block diagram shown in FIG. 1. Referring to FIG. 1, reference numeral 101 denotes input 12-bit image data per color component. Reference numeral 103 denotes a color converter; and 105, a level shifter. Reference numeral 107 denotes a DCT transformer; 109, a quantizer; and 111, a Huffman coder. Reference numeral 113 denotes a quantization table storage unit; and 115, coded data generated by the coding processing.

When three components of a full-color image are three primary colors R, G, and B, the color converter 103 converts the three primary colors R, G, and B into Y, Cb, and Cr as luminance and color difference signals. This color conversion normally uses following formulas that comply with ITU-R BT.601:

$$Y=0.299 \times R+0.587 \times G+0.114 \times B$$

$$Cb=(-0.299 \times R-0.587 \times G+0.886 \times B) \times 0.564$$

$$Cr=(0.701 \times R-0.587 \times G-0.114 \times B) \times 0.713$$

Next, the level shifter 105 executes processing given by:

$$Y'=Y-k$$

where a value k=2048 is used in 12-bit data conversion.

The color-converted Y, Cb, and Cr components are transformed into DCT coefficients by the DCT transformer 107, and the DCT coefficients are sent to the quantizer 109.

In extended JPEG, since image data is expanded from 8 bits to 12 bits compared to baseline JPEG, the range is expanded to about 16 times. Since color conversion and DCT transformation adopt linear conversion, 16-fold expanded data is still 16-fold expanded after conversion. Therefore, the DCT coefficients in extended JPEG are 16 times those in baseline JPEG.

The quantizer 109 converts the DCT coefficients into quantization values by dividing them by a quantization step value read out from the quantization table storage unit 113. When the 16-fold expanded DCT coefficients are quantized using a quantization table for baseline JPEG, quantization values also become 16 times. The 16-fold quantization values are sent to the Huffman coder 111.

The Huffman coder 111 generates the coded data 115 by Huffman-coding the quantization values based on a Huffman table (not shown).

As the Huffman table used upon Huffman-coding the 16-fold quantization value, a Huffman table for baseline JPEG cannot be used, and a table in which Huffman codes are assigned to all combinations of 1- to 16-fold quantization values and zero-runs is required. The required Huffman table size is many greater than that of baseline JPEG.

In header information of the coded data 115, various parameters such as an SOF1 marker indicating the extended JPEG code, the image size, and the like, and quantization table information are written. This is specified by "ITU-T recommendation T.81 (ISO/IEC 10918-1)".

The processing system shown in FIG. 1 compliant to the extended JPEG coding processing has an implementation that assumes a 12-bit full-range input.

When the conventional processing system codes a 12-bit image by extended JPEG, the following problems are posed.

The range of data accepted by a Huffman table of an entropy coder which can code a 12-bit image has a many greater table than that for baseline JPEG, resulting in an increase in circuit scale of the entropy coder.

In order to efficiently compress images having different numbers of bits, Huffman tables dedicated to the respective numbers of bits must be prepared, and the scale of all the Huffman tables still increases. That is, Huffman tables for 8-, 9-, 10-, 11-, and 12-bit images are required.

SUMMARY OF THE INVENTION

The present invention has been made in consideration of the aforementioned problems, and has as its object to provide a technique which can reduce the Huffman table size irrespective of the numbers of bits of components of input image data to be coded.

In order to achieve the above object, for example, an image coding apparatus according to the present invention comprises the following arrangement. That is, there is provided an image coding apparatus for JPEG-coding image data, one color component of which is expressed by the number n of bits which falls within a range from K to L bits (L>K), comprising:

quantization value storage means for storing basic quantization values $Q_{i,j}$;

determination means for determining an allowable minimum quantization step value $Q_{n\_min}$ specified by the number n of bits;

calculation means for calculating quantization step values $Q'_{i,j}$ having values not less than the allowable minimum quantization step value $Q_{n\_min}$ based on the allowable minimum quantization step value $Q_{n\_min}$ specified determined by the determination means and the basic quantization values $Q_{i,j}$;

quantization means for quantizing transformation coefficients obtained as a result of orthogonal transformation using the calculated quantization step values $Q'_{i,j}$; and Huffman coding means for Huffman-coding the quantization coefficients obtained by the quantization means, using a Huffman table corresponding to the basic quantization values $Q_{i,j}$.

Further features of the present invention will be apparent from the following description of exemplary embodiments with reference to the attached drawings.

BRIEF DESCRIPTION OF THE DRAWINGS

FIG. 4 shows quantization step values stored in a basic quantization table storage unit;

FIG. 5 shows an example of a table in a minimum quantization step value generator.

DESCRIPTION OF THE EMBODIMENTS

Figure 1:
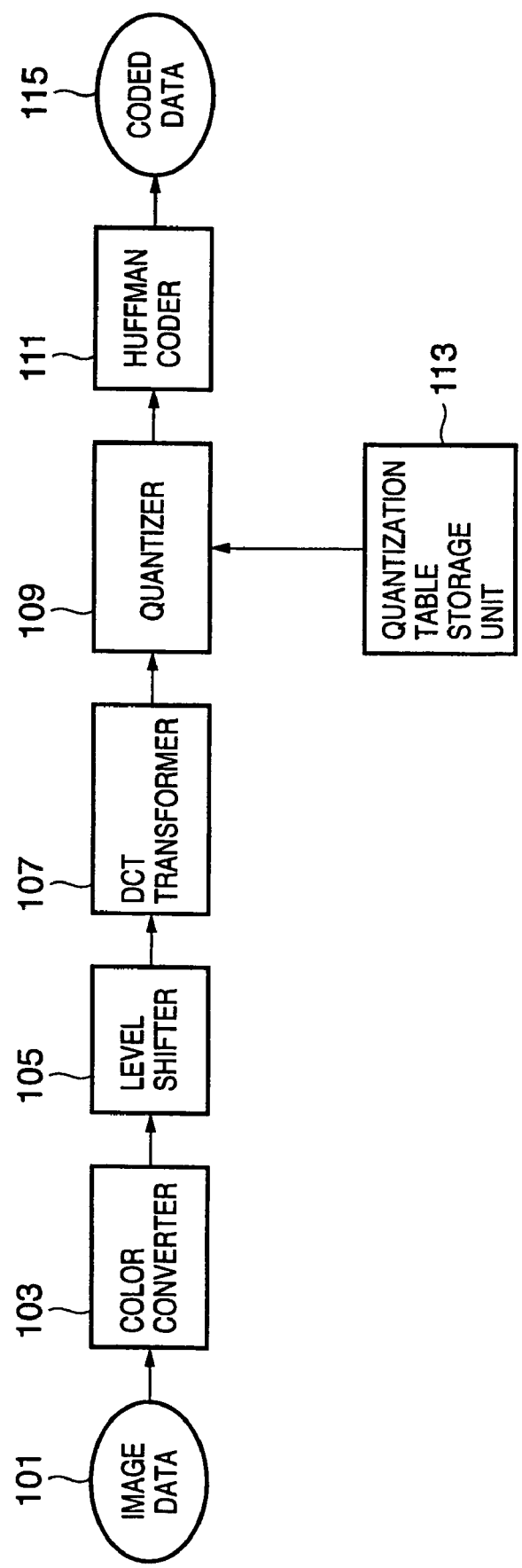
FIG. 1 is a block diagram of a general coding apparatus.

Preferred embodiments according to the present invention will be described in detail with reference to the accompanying drawings.

First Embodiment

The first embodiment will exemplify JPEG-coding of 9- to 12-bit image data using a Huffman table for baseline JPEG.

Baseline JPEG supports compression of 8-bit data, and extended JPEG supports that of 8- or 12-bit data. Therefore, data of other numbers of bits, e.g., 9-, 10-, and 11-bit data cannot be compressed intact. Hence, as for 9-, 10-, and 11-bit data, zero is appended to each lower bit or scaling is applied to convert such data into 12-bit data upon compression by extended JPEG. This is the conventional method.

Upon extended JPEG coding in a 12-bit mode, in order to level-shift the range from 0 to 4095 of luminance signals, processing for subtracting an intermediate level "2048" from all luminance signals is executed. With this processing, the ranges of luminance signals and color difference signals can be matched to commonize the subsequent processes.

When the extended JPEG compression processing is applied to 10-bit data without 12-bit conversion, since the intermediate level "2048" is subtracted from luminance signals, the range from 0 to 1023 is shifted to that from –2048 to –1025. Therefore, the range of luminance signals does not match that of color difference signals: –512 to 511. Also, the range is expanded in view of absolute values, and such expansion is not preferable in terms of compression efficiency and the scale of the signal processing circuit.

Such drawback can be solved by switching the intermediate level to be subtracted from luminance signals in correspondence with the number of bits of data. For example, when 10-bit data undergoes compression processing intact, if "512" is used as the intermediate level to be subtracted from luminance signals, the range after subtraction is –512 to 511, and is the same as that of color difference signals.

The maximum absolute values of luminance signals which are level-shifted to be matched with the range of color difference signals are 128, 256, 512, 1024, and 2048 for 8-, 9-, 10-, 11-, and 12-bit data, respectively, and the maximum absolute value assumes a 2-fold value every time the number of bits is increased by 1 bit.

The data which has undergone the color conversion and level-shift processing then undergoes DCT transformation. Since DCT transformation is linear transformation, if input data have 2-, 4-, 8-, and 16-fold sizes, coefficient data after transformation also have 2-, 4-, 8-, and 16-fold sizes.

Therefore, a quantization value obtained when data is quantized by 1 upon coding 8-bit data is basically the same as those obtained when data are quantized by 2, 4, 8, and 16 upon coding 9-, 10-, 11-, and 12-bit data. If the same source data is used, the differences among these quantization values are those of arithmetic precision due to differences of the numbers of data bits and the numbers of arithmetic bits.

A quantization value obtained if data is quantized by "1" upon coding 8-bit data can be entropy-coded using a Huffman table for baseline JPEG. Therefore, upon coding 9-, 10-, 11-, and 12-bit data, quantization values obtained when data are quantized by "2", "4", "8", and "16" can also be coded using a Huffman table for baseline JPEG.

Therefore, as can be seen from the above description, 9-bit data can be coded using a Huffman table for baseline JPEG if quantization is made using a quantization step value twice or more that for 8-bit data. Also, quantization can be made using a quantization step value four times or more that for 8 bits upon coding 10-bit data, eight times or more that for 8 bits upon coding 11-bit data, and 16 times or more that for 8 bits upon coding 12-bit data. When a Huffman coder 211 outputs coded data, its header stores information indicating the number of input bits.

Figure 2:
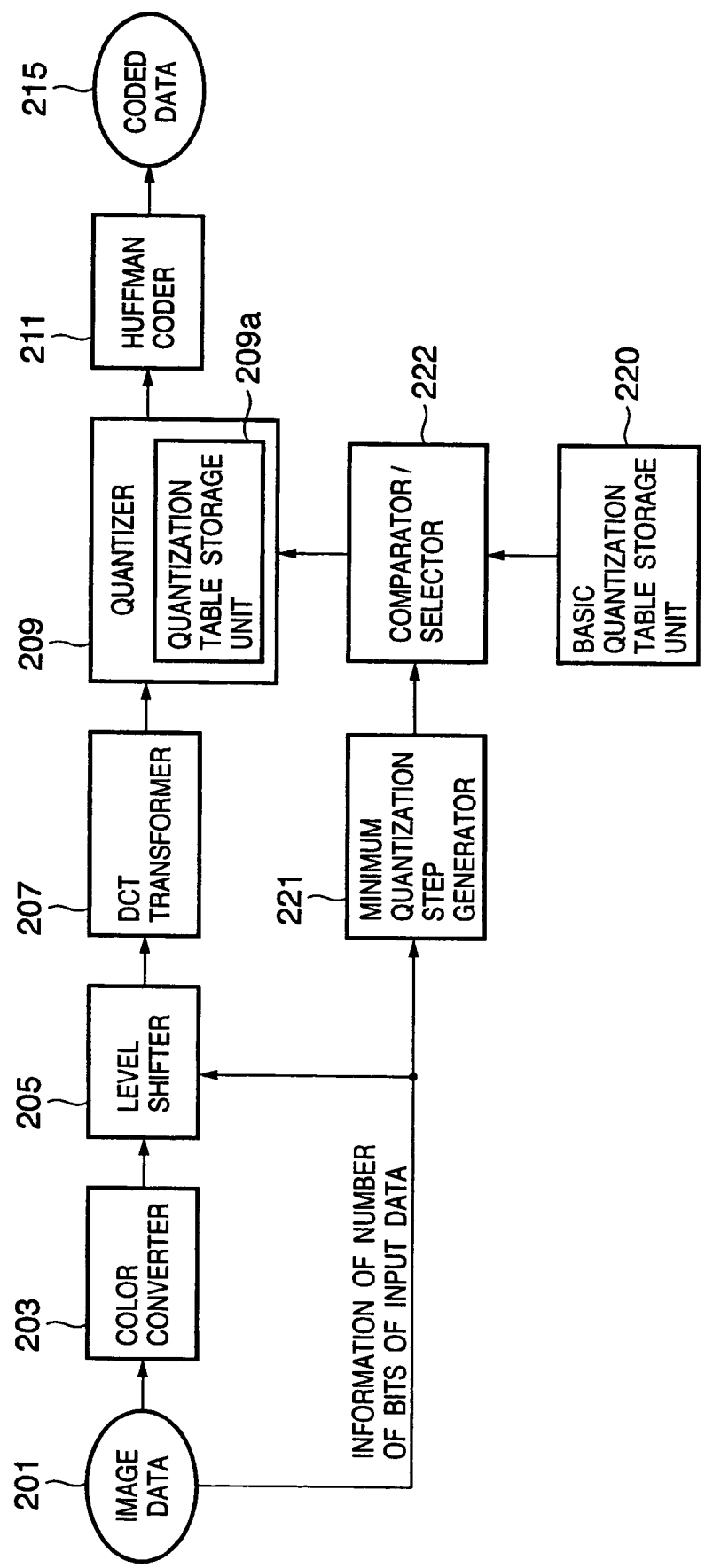
FIG. 2 is a block diagram of a coding apparatus according to the first embodiment of the present invention.

FIG. 2 is a block diagram showing an image coding apparatus according to the first embodiment.

Referring to FIG. 2, reference numerals 201 to 215 denote components which have substantially the same functions as those of the components 101 to 115 in FIG. 1. A level shifter 205 changes a shift value k in correspondence with the number of bits of each color component of an image to be coded. That is, if image data is expressed by i bits (i≧8), the level shifter 205 subtracts $k=128\times2^{i-8}$ from a color-converted luminance component Y.

A basic quantization table storage unit 220 stores quantization step values used upon baseline JPEG coding. Since DCT transformation is done for 8×8 pixels, this basic quantization table storage unit 220 stores quantization step values $Q_{0,0}$ to $Q_{7,7}$, as shown in FIG. 4.

A minimum quantization step generator 221 has a table that stores minimum step values $Q_{n\_min}$ (n=8, 9, ..., 12), as shown in, e.g., FIG. 5. At the beginning of coding of image data 201, the minimum quantization step generator 221 checks the number of bits of each color components of input image data, selects one minimum step value $Q_{n\_min}$ in correspondence with the number of bits, and outputs it to a comparator/selector 222.

The comparator/selector 222 compares the minimum step value $Q_{n\_min}$ output from the minimum quantization step generator 221 with the quantization step $Q_{i,j}$ stored in the basic quantization table storage unit 220 in turn, and outputs a larger one to a quantizer 209. Let $Q'_{i,j}$ be the quantization step value to be output. Then the comparator/selector 222 executes the following arithmetic processing:

$$Q'_{i,j} = MAX(Q_{i,j}, Q_{n\_min})$$

where MAX(A, B) means a function which returns a larger one of values A and B. In case of hardware implementation, the comparator/selector 222 can be implemented by a comparator circuit and the like.

The quantizer 209 stores the 8×8 quantization step values $Q'_{i,j}$, which are output from the comparator/selector 222, as described above, in a quantization table storage unit 209a, and quantizes 8×8 DCT coefficients output from a DCT transformer 207 as a unit. Normally, since the number of bits of each pixel of one image data is fixed, the storage processing of the quantization step values Q' in the quantization table storage unit 209a can be done only once at the beginning of coding of the image data 201.

The minimum quantization step generator 221 will be described in more detail below. In FIG. 5, $Q_{n\_min}$ is set to be the same value as a minimum value of the 8×8 quantization step values stored in basic quantization table storage unit 220. Therefore, when each component of image data to be coded is expressed by 8 bits, the quantization step values $Q'_{i,j}$ stored in the quantization table storage unit 209a in the quantizer 209 are equal to the quantization step values $Q_{i,j}$ stored in the basic quantization table storage unit 220. As a result, when each component of an input image is expressed by 8 bits, the apparatus shown in FIG. 1 serves as a baseline JPEG coding apparatus.

When input pixel data is expressed by 9 bits, DCT coefficients after its DCT transformation have a range twice those generated in baseline JPEG according to the aforementioned principle. Therefore, when quantization is done by quantization step values having a value $Q_{8\_min} \times 2$ at minimum, values after quantization can be coded by the Huffman coder for baseline JPEG.

That is, $Q_{9\_min}$ need only assume a value twice $Q_{8\_min}$. Also, $Q_{10\_min}$ need only assume a value twice $Q_{9\_min}$. The relationship given by a general formula:

$$Q_{n\_min} = Q_{8\_min} \times 2^{(n-8)} \quad (1)$$

need only be provided (for n is an integer equal to or larger than 8).

As described above, according to the arrangement of this embodiment, since the quantization steps to be used are set to be values equal to or larger than the minimum quantization step value corresponding to the number of bits of input data, a common Huffman table for baseline JPEG can be used for image data having any numbers of bits.

The effect that 8-bit data can be coded using the Huffman table for baseline JPEG when quantization is done using a quantization step "1" will be examined in more detail below.

The quantization step "1" has a slight margin, but how much margin that quantization step has is not apparent. If the margin is 10%, a quantization value obtained by quantization using a quantization step "0.9" can be coded by the Huffman table for 8 bits.

Since only integers are used as quantization values in the JPEG standard, the quantization step "0.9" is insignificant but it becomes significant upon coding 12-bit data. That is, this means that when quantization is done using a quantization step "15" obtained by converting "14.4" as a 16-fold value of "0.9" into an integer by counting its fractions as one, data can be coded using the Huffman table for baseline JPEG.

If the margin is larger, the Huffman table for 8 bits may be used if quantization is made using a smaller quantization step "14". In this case, the quantization step upon coding 11-bit data can be 7 or more.

Therefore, note that equation (1) above is premised on that there is no margin. That is, the relationship that satisfies:

$$Q_{n\_min} \approx Q_{8\_min} \times 2^{(n-8)}$$

or by defining a constant C(n) (C(n)>0) which varies according to the number of bits, the relationship that satisfies:

$$Q_{(n-1)\_min} \times 2 - C(n) \leq Q_{n\_min} \leq Q_{(n-1)\_min} \times 2 + C(n)$$

may be provided.

In FIG. 1, when an image data file to be coded is input, the minimum quantization step generator 221 detects the number of bits by checking its header. In some cases, when the minimum quantization step generator 221 determines a minimum quantization step value depending on hardware or the like without receiving any files, it may determine and output a minimum quantization step value based on the state of a dip switch or an instruction from a control panel.

The Huffman table for baseline JPEG in this embodiment is a well-known table which is described in the specification, and the above description has been given with reference to this table. Of course, other Huffman tables may be used. For example, a Huffman table which adjusts an 8-bit image to a minimum quantization step "2" has a size smaller than the Huffman table for baseline JPEG. This table can be used as a common Huffman table. In this case, a minimum quantization step "2×2" can be set for a 9-bit image, and a minimum quantization step "2×4" can be set for a 10-bit image upon coding.

Figure 6:
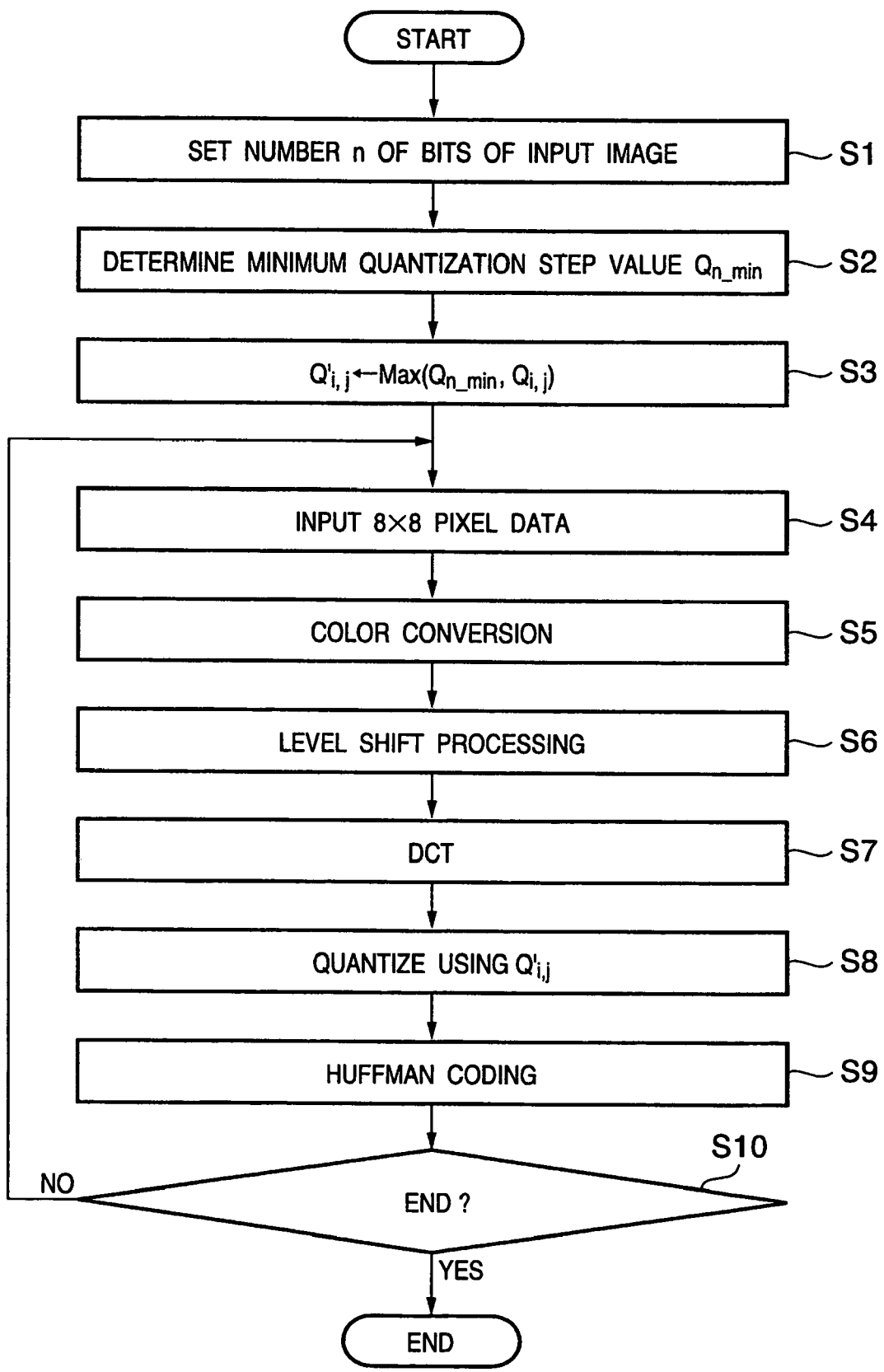
FIG. 6 is a flowchart showing the processing sequence of the first embodiment.

FIG. 6 is a flowchart showing the processing sequence when the aforementioned processing is implemented by software (computer program). This program can be considered as a part of an application program executed by a general-purpose information processing apparatus such as a personal computer or the like.

In step S1, the number n of bits of each color component of image data to be coded is set. This setting may be made by checking the header of an image data file to be coded, or it may be made by the user via a GUI.

The flow advances to step S2 to calculate a minimum quantization step value $Q_{n\_min}$ according to the set number n of bits. After that, the flow advances to step S3 to compare the basic quantization step value $Q_{i,j}$ (i, j=0, 1, . . . , 7) with the minimum quantization step value $Q_{n\_min}$ in turn and to determine a larger one as $Q'_{i,j}$.

As a result of the above processing, since preparation for coding processing is completed, processes equivalent to the order of the processing blocks in FIG. 2 are executed in steps S4 to S9. Note that quantization processing (step S8) is executed using the quantization steps $Q'_{i,j}$ determined in the previous step. This processing is repeated until it is determined in step S10 that processing for the entire image is completed.

Second Embodiment

Figure 3:
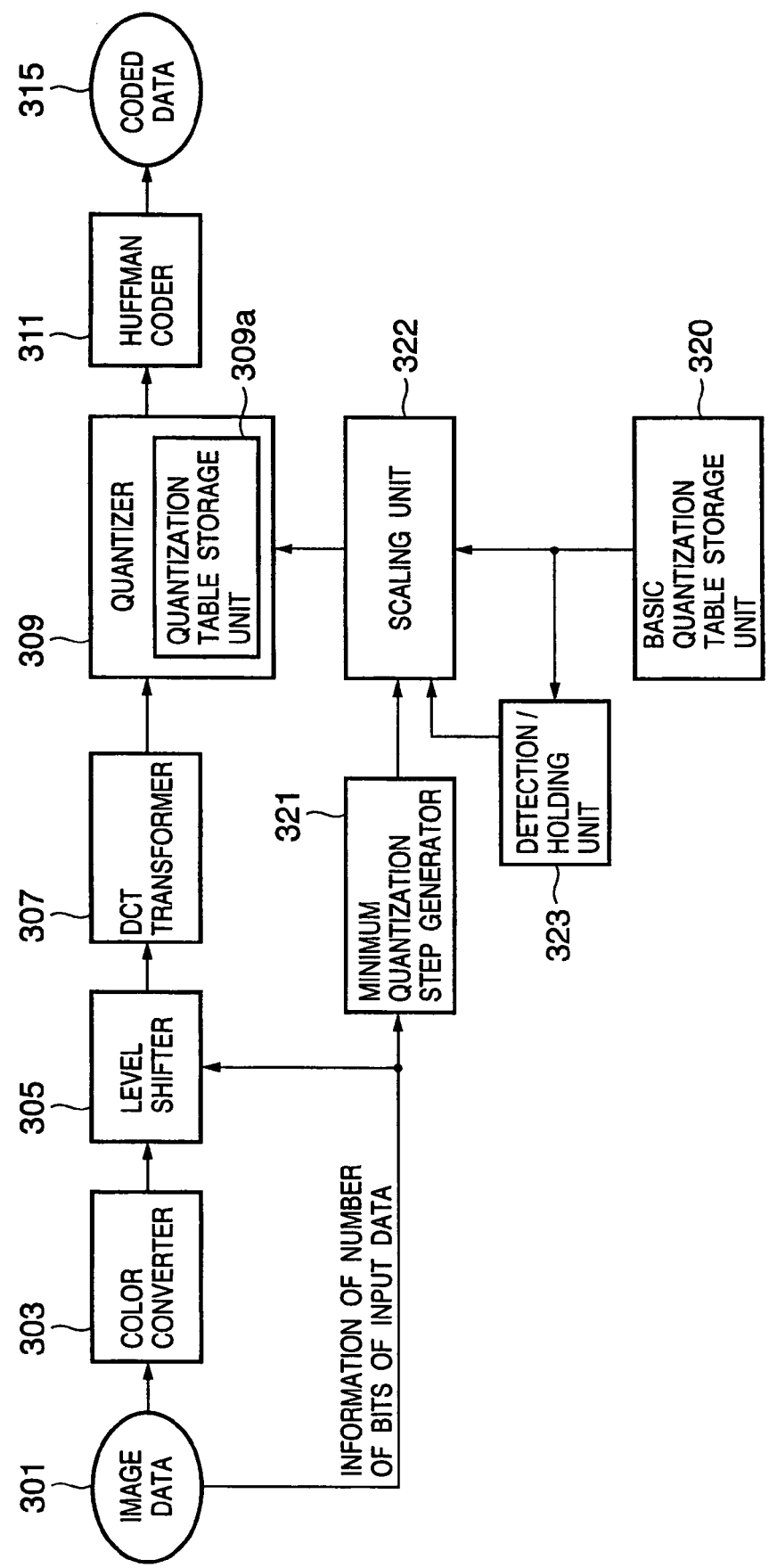
FIG. 3 is a block diagram of a coding apparatus according to the second embodiment of the present invention.

FIG. 3 is a block diagram of an image coding apparatus according to the second embodiment. FIG. 3 is basically the same as FIG. 2. That is, components 301 to 315, 321, and 320 are the same as those in FIG. 2. Differences from FIG. 2 are that a scaling unit 322 is provided in place of the comparator/selector 222, and a detection/holding unit 323 is added.

A detection/holding unit 323 detects and holds a minimum value of quantization step values stored in a basic quantization table storage unit 320. A scaling unit 322 applies scaling to the quantization step output from the basic quantization table storage unit 320. The two processing units which are added will be described in more detail below.

The detection/holding unit 323 detects and holds a minimum quantization step from the basic quantization table storage unit 320 designated for use in coding processing at the beginning of coding of one image.

The scaling unit 322 divides a set quantization step value from a minimum quantization step value generator 321 by the minimum quantization step value detected and held by the detection/holding unit 323. The scaling unit 322 then multiplies a quantization step value by the quotient every time it is read out from the basic quantization table storage unit 320, and outputs the product to a quantizer 309. As a result, a quantization table storage unit 309a in the quantizer 309 stores quantization step values for an input image.

For example, let $Q_{min}$ be the minimum value of quantization step values $Q_{i,j}$ in the basic quantization table storage unit 320. Also, let n be the number of bits of each color component of one pixel of image data to be coded, and $Q_{n\_min}$ be a minimum quantization step value output from the minimum quantization step value generator 321. Then, each quantization step value $Q'_{i,j}$ to be stored in the quantization table storage unit 309a in the quantizer 309 is given by:

$$Q'_{i,j} = Q_{i,j} \times Q_{min} / Q_{n\_min}$$

In this way, the minimum quantization step $Q_{min}$ in a basic quantization table assumes a value proportional to the set quantization step value $Q_{n\_min}$, and other quantization steps assume values proportional to it. As described above, a quantization step value $Q'_{i,j}$ used in practice is an integer. Therefore, strictly speaking, if an integer conversion function Int( ) is used, the above conversion formula can be rewritten as:

$$Q'_{i,j} = \text{Int}(Q_{i,j} \times Q_{min} / Q_{n\_min})$$

In case of hardware implementation, the bits below the decimal point may be dropped.

In the first embodiment described above, a quantization step value larger than the minimum quantization step value $Q_{n\_min}$ in the quantization step values $Q_{i,j}$ is stored in the quantization table storage unit 309a intact. By contrast, according to the second embodiment, since all the quantization steps $Q_{i,j}$ are converted in accordance with the number of bits of an input image, coded data which can assure higher image quality can be generated.

Especially, according to the second embodiment, quantization step values stored in the basic quantization table storage unit 320 are not limited to those for baseline JPEG (8-bit JPEG). For example, when quantization step values for 10 bits per color component are stored in the basic quantization table storage unit 320, deterioration of image quality for 8-bit or 9-bit image data can be substantially equivalent to that upon quantization using dedicated quantization step values.

As described above, according to the second embodiment, entropy coding can be done using a common Huffman table for the specific number of bits.

Third Embodiment

The above two embodiments use only one common Huffman table. That is, images of every numbers of bits are coded by one common Huffman table.

The third embodiment will explain a case wherein the numbers of bits of images to be coded are divided into groups, and coding is made using a common Huffman table for each group.

More specifically, a first common Huffman table used to code images the numbers of bits of which are 8, 9, and 10 bits, and a second common Huffman table used to code an image of 11 bits or more are prepared upon entropy coding.

In this case, minimum quantization steps α, 2α, and 4α are set for 8-, 9-, and 10-bit images, and a minimum quantization step "(n−11)-th power of β×2" is set for an n-bit image of 11 bits or more.

This embodiment can be applied to both FIGS. 2 and 3, except that two Huffman tables are prepared in the Huffman coder 211 or 311, and one of the two Huffman tables is selected in correspondence with the number of bits of an image.

As described above, according to the third embodiment, upon coding an image of N bits (N=12 in this embodiment) equal to or larger than 8 bits per color component of one pixel, even if Huffman tables for respective "N−8+1" numbers of bits are not prepared, coding can be easily done.

The embodiments according to the present invention have been described. The present invention can also be implemented by a computer program, as described above. Normally, the computer program is stored in a computer readable storage medium such as a CD-ROM or the like, and is ready to run after the medium is set in a computer and is copied or installed in the system. Therefore, such computer readable storage medium is included in the scope of the present invention.

According to the present invention, upon JPEG-coding image data expressed by n bits falling within a range from L to K, Huffman coding can be done using a common Huffman table according to basic quantization values $Q_{i,j}$. Therefore, the size of the Huffman table can be suppressed from increasing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-221461, filed Jul. 29, 2005, which is hereby incorporated by reference herein in its entirety.

What is claimed is:

1. An image coding apparatus for JPEG coding image data, one color component of which is expressed by the number n of bits which falls within a range from K to L bits (L>K), comprising:

quantization value storage means for storing basic quantization values Qi,j;

determination means for determining an allowable minimum quantization step value Qn_min specified by the number n of bits;

calculation means for calculating quantization step values Q'i,j having values not less than the allowable minimum quantization step value Qn_min based on the allowable minimum quantization step value Qn_min determined by said determination means and the basic quantization values Qi,j;

quantization means for quantizing transformation coefficients obtained as a result of orthogonal transformation using the calculated quantization step values Q'i,j; and Huffman encoding means for Huffman encoding the quantization coefficients obtained by said quantization means, using a Huffman table corresponding to the basic quantization values Qi,j,
wherein said calculation means calculates:

$$Q'_{i,j} = \text{Max}(Q_{n\_min}, Q_{i,j})$$

(Max(a, b) is a function of selecting a larger one of a and b).

2. An image coding apparatus for JPEG coding image data, one color component of which is expressed by the number n of bits which falls within a range from K to L bits (L>K), comprising:
  quantization value storage means for storing basic quantization values Qi,j;
  determination means for determining an allowable minimum quantization step value Qn_min specified by the number n of bits;
  calculation means for calculating quantization step values Q'i,j having values not less than the allowable minimum quantization step value Qn_min based on the allowable minimum quantization step value Qn_min determined by said determination means and the basic quantization values Qi,j;
  quantization means for quantizing transformation coefficients obtained as a result of orthogonal transformation using the calculated quantization step values Q'i,j; and
  Huffman encoding means for Huffman encoding the quantization coefficients obtained by said quantization means, using a Huffman table corresponding to the basic quantization values Qi,j,
  wherein said calculation means calculates:

$$Q'_{i,j} = Q_{i,j} \times \{Q_{min}/Q_{n\_min}\}$$

where $Q_{min}$ is a minimum quantization value stored in said quantization value storage means.

3. An image coding apparatus for JPEG coding image data, one color component of which is expressed by the number n of bits which falls within a range from K to L bits (L>K), comprising:
  quantization value storage means for storing basic quantization values Qi,j;
  determination means for determining an allowable minimum quantization step value Qn_min specified by the number n of bits;
  calculation means for calculating quantization step values Q'i,j having values not less than the allowable minimum quantization step value Qn_min based on the allowable minimum quantization step value Qn_min determined by said determination means and the basic quantization values Qi,j;
  quantization means for quantizing transformation coefficients obtained as a result of orthogonal transformation using the calculated quantization step values Q'i,j; and
  Huffman encoding means for Huffman encoding the quantization coefficients obtained by said quantization means, using a Huffman table corresponding to the basic quantization values Qi,j,
  wherein said quantization value storage means divides a range of the numbers of bits that can be coded into a plurality of groups, and stores quantization values for the minimum number of bits in each group as the basic quantization values, and
  said image coding apparatus further comprises means for determining the basic quantization values to be used depending upon to which group the number of bits of an input pixel to be coded belongs.

4. A method for JPEG coding image data, one color component of which is expressed by the number n of bits which falls within a range from K to L bits (L>K), comprising the steps of:
  storing basic quantization values Qi,j;
  determining an allowable minimum quantization step value Qn_min specified by the number n of bits;
  calculating quantization step values Q'i,j having values not less than the allowable minimum quantization step value Qn_min based on the allowable minimum quantization step value Qn_min specified determined in said determining step and the basic quantization values Qi,j;
  quantizing transformation coefficients obtained as a result of orthogonal transformation using the calculated quantization step values Q'i,j; and
  Huffman encoding the quantization coefficients obtained in said quantizing step, using a Huffman table corresponding to the basic quantization values Qi,j,
  wherein said calculating step calculates:

$$Q'_{i,j} = \text{Max}(Q_{n\_min}, Q_{i,j})$$

(Max(a, b) is a function of selecting a larger one of a and b).

5. A method for JPEG coding image data, one color component of which is expressed by the number n of bits which falls within a range from K to L bits (L>K), said method comprising the steps of:
  storing basic quantization values Qi,j;
  determining an allowable minimum quantization step value Qn_min specified by the number n of bits;
  calculating quantization step values Q'i,j having values not less than the allowable minimum quantization step value Qn_min based on the allowable minimum quantization step value Qn_min determined in said determining step and the basic quantization values Qi,j;
  quantizing transformation coefficients obtained as a result of orthogonal transformation using the calculated quantization step values Q'i,j; and
  Huffman encoding the quantization coefficients obtained in said quantizing step, using a Huffman table corresponding to the basic quantization values Qi,j,
  wherein said calculating step calculates:

$$Q'_{i,j} = Q_{i,j} \times \{Q_{min}/Q_{n\_min}\}$$

where $Q_{min}$ is a minimum quantization value stored in said storing step.

6. A method for JPEG coding image data, one color component of which is expressed by the number n of bits which falls within a range from K to L bits (L>K), said method comprising the steps of:
  storing basic quantization values Qi,j;
  determining an allowable minimum quantization step value Qn_min specified by the number n of bits;
  calculating quantization step values Q'i,j having values not less than the allowable minimum quantization step value Qn_min based on the allowable minimum quantization step value Qn_min determined in said determining step and the basic quantization values Qi,j;
  quantizing transformation coefficients obtained as a result of orthogonal transformation using the calculated quantization step values Q'i,j; and
  Huffman encoding the quantization coefficients obtained in said quantizing step, using a Huffman table corresponding to the basic quantization values Qi,j,
  wherein said storing step divides a range of the numbers of bits that can be coded into a plurality of groups, and stores quantization values for the minimum number of bits in each group as the basic quantization values, and said method further comprises a step of determining the basic quantization values to be used depending upon to which group the number of bits of an input pixel to be coded belongs.

7. A computer-readable storage medium embodying a program for causing a computer to perform a method for JPEG coding image data, one color component of which is expressed by the number n of bits which falls within a range from K to L bits (L>K), the method comprising the steps of:

storing basic quantization values Qi,j;

determining an allowable minimum quantization step value Qn_min specified by the number n of bits;

calculating quantization step values Q'i,j having values not less than the allowable minimum quantization step value Qn_min based on the allowable minimum quantization step value Qn_min specified determined in said determining step and the basic quantization values Qi,j;

quantizing transformation coefficients obtained as a result of orthogonal transformation using the calculated quantization step values Q'i,j; and Huffman encoding the quantization coefficients obtained in said quantizing step, using a Huffman table corresponding to the basic quantization values Qi,j, wherein said calculating step calculates:

$$Q'_{i,j} = \text{Max}(Q_{n\_min}, Q_{i,j})$$

(Max(a, b) is a function of selecting a larger one of a and b).

8. A computer-readable storage medium embodying a program for causing a computer to perform a method for JPEG coding image data, one color component of which is expressed by the number n of bits which falls within a range from K to L bits (L>K), the method comprising the steps of:

storing basic quantization values Qi,j;

determining an allowable minimum quantization step value Qn_min specified by the number n of bits;

calculating quantization step values Q'i,j having values not less than the allowable minimum quantization step value Qn_min based on the allowable minimum quantization step value Qn_min determined in said determining step and the basic quantization values Qi,j;

quantizing transformation coefficients obtained as a result of orthogonal transformation using the calculated quantization step values Q'i,j; and Huffman encoding the quantization coefficients obtained in said quantizing step, using a Huffman table corresponding to the basic quantization values Qi,j, wherein said calculating step calculates:

$$Q'_{i,j} = Q_{i,j} \times \{Q_{min}/Q_{n\_min}\}$$

where $Q_{min}$ is a minimum quantization value stored in said storing step.

9. A computer-readable storage medium embodying a program for causing a computer to perform a method for JPEG coding image data, one color component of which is expressed by the number n of bits which falls within a range from K to L bits (L>K), the method comprising the steps of:

storing basic quantization values Qi,j;

determining an allowable minimum quantization step value Qn_min specified by the number n of bits;

calculating quantization step values Q'i,j having values not less than the allowable minimum quantization step value Qn_min based on the allowable minimum quantization step value Qn_min determined in said determining step and the basic quantization values Qi,j;

quantizing transformation coefficients obtained as a result of orthogonal transformation using the calculated quantization step values Q'i,j; and Huffman encoding the quantization coefficients obtained in said quantizing step, using a Huffman table corresponding to the basic quantization values Qi,j, wherein said storing step divides a range of the numbers of bits that can be coded into a plurality of groups, and stores quantization values for the minimum number of bits in each group as the basic quantization values, and said method further comprises a step of determining the basic quantization values to be used depending upon to which group the number of bits of an input pixel to be coded belongs.

* * * * *